United States Patent [19]

Griffith

[11] 4,228,386

[45] Oct. 14, 1980

[54] AIRCRAFT SERVOACTUATOR APPARATUS

[75] Inventor: Carl D. Griffith, Phoeniz, Ariz.

[73] Assignee: Sperry Corporation, New York, N.Y.

[21] Appl. No.: 912,165

[22] Filed: Jun. 2, 1978

[51] Int. Cl.² .............................................. G05B 11/01
[52] U.S. Cl. .................................... 318/628; 244/223;
318/584
[58] Field of Search ............... 318/628, 584, 586, 591;
244/83 D; 74/480

[56] References Cited

U.S. PATENT DOCUMENTS

| | | | |
|---|---|---|---|
| 2,695,145 | 11/1954 | Lear et al. | 244/83 D |
| 2,760,739 | 8/1956 | Reichert | 318/628 X |
| 2,833,496 | 5/1958 | McRuer et al. | 318/591 X |
| 4,106,728 | 8/1978 | Griffith | 318/628 X |

Primary Examiner—B. Dobeck
Attorney, Agent, or Firm—Howard P. Terry

[57] ABSTRACT

A single actuator unit is installed in an aircraft, for example, a helicopter, and is coupled to the control linkage from the pilot's stick to perform the functions of series actuation, trim actuation, artificial feel, control position sensing, control limits and, if needed, force boost. Although the device performs as a series actuator, it is installed in and connected to the vehicle surface control linkages in the conventional parallel actuator manner and therefore greatly simplifies control system installation and reduces problems associated with control rod vibration resonances normally encountered with series actuator installations.

12 Claims, 3 Drawing Figures

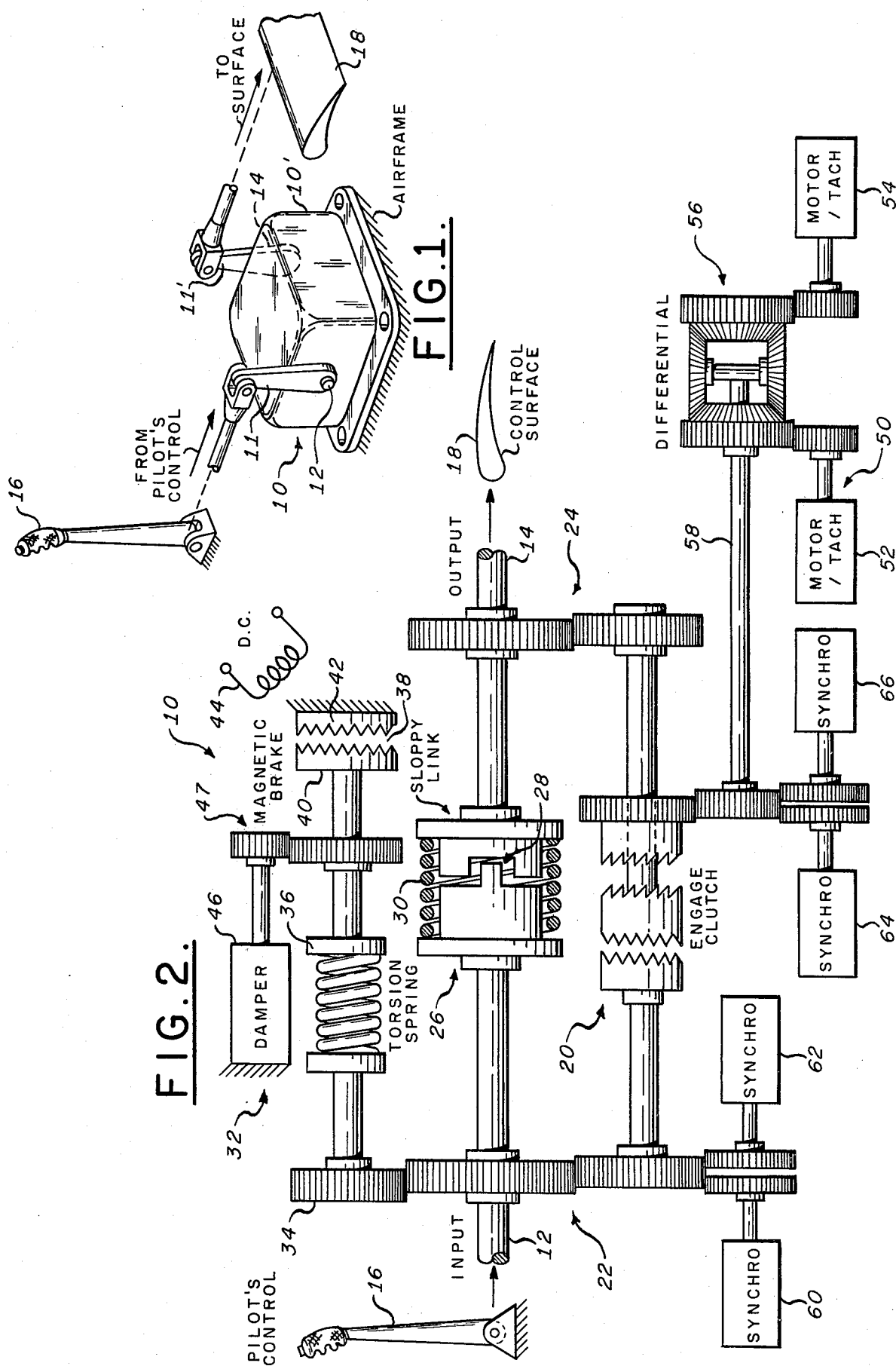

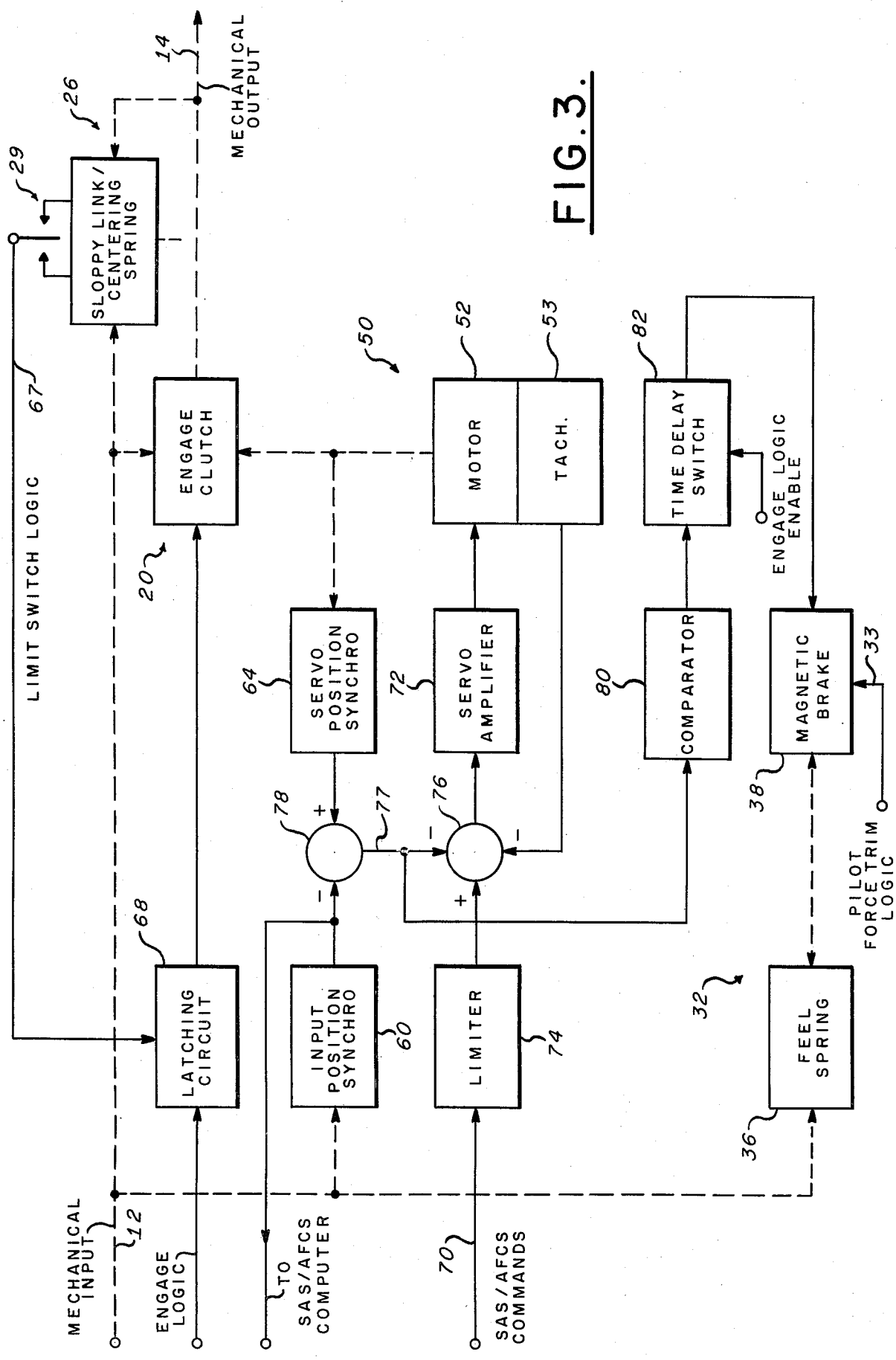

AIRCRAFT SERVOACTUATOR APPARATUS

BACKGROUND OF THE INVENTION

1. Field of the Invention

This invention relates to control actuators for aircraft and, more particularly, to a combined series, trim, feel and boost actuator for an aircraft control member.

2. Description of the Prior Art

Typically, in the retrofit aircraft control system market, particularly control systems for helicopters, costly modifications to the existing control systems are required to install the necessary stabilization augmentation and automatic flight control system actuators. Such actuators are of two types: series and parallel, both of which have their advantages and disadvantages. Moreover, in order to provide a complete automatic control system, the following are usually required: a plurality of actuators, an artificial feel spring, a magnetic brake, a trim motor, hydraulic or electric boost servos, control position transducers and control stops. As the above items are typically required for each axis of control, the retrofit becomes extremely difficult and time consuming adding not only to the system's weight but also to the total cost thereof. Even in original helicopter installations, the mounting of separate series and trim actuators and their associated components is difficult and costly.

As mentioned above, actuators may be of two types: parallel and series. The parallel actuator is coupled or bolted directly to the vehicle and thus is subjected to minimum vibration resonances. Furthermore, in a parallel actuator system, the operation is a "hands off" mode wherein the parallel actuator moves both the control surface and the control stick. In a series mode of actuator operation, however, the actuator is not normally directly coupled to the aircraft but, rather, is coupled between the pilot's stick and the control surface, that is, floating or ungrounded. The series actuator, moreover, does not move the stick and has a limited control authority to drive the control surface. Furthermore, as the series actuator is not usually mounted to the vehicle, it is subject to vibration resonances of the control rod in which it is normally installed.

Accordingly, it is desirable to provide an actuator which provides in a single apparatus similar to a conventional parallel actuator, the functions of series actuation, trim actuation, artificial feel, control position sensing, control limits and, if needed or desired, force boost.

SUMMARY OF THE INVENTION

In accordance with the invention, the difficulties of the prior art with respect to stabilization and automatic control actuators are to a great extent alleviated through this invention.

Specifically, the invention comprises an electromechanical series-trim actuator for providing the functions of series-trim actuation, artificial feel and force boost where required, while being mounted to the aircraft fixed structure and less subject to vehicle vibriations.

More specifically, the fixed actuator of this invention comprises input means coupled to the pilot's control stick and associated linkages and output means connected to the appropriate control surface and associated linkages. The servoactuator further includes a dual function or dual mode engage clutch which in one mode, auto stabilization system disengaged, directly couples the input means to the output means, and in the other mode, the engage mode, disengages the input-output connnection and engages a servo drive means, responsive to the automatic stabilization and control system outputs, to the output means. The actuator also includes position synchros coupled to the input means and the servomotor means, the differential signal of the synchros providing an input to the servo amplifier for driving the output in response to the control stick input during, for example, an engaged boost mode. The actuator of this invention also includes link or coupling means, having a free play or dead zone, coupled between the input means and the output means, the dead zone settable at the desired servo actuator authority and limit switches at the desired authority limit to disengage the servo means and directly couple the input means to the output means. Artificial feel in the boost mode is provided by clutched spring means under control of trim commands.

The various features of novelty which characterize the invention are pointed out with particularity in the claims annexed to and forming a part of this specification. For a better understanding of the invention, its operating advantages and specific objects attained by its use, reference should be had to the accompanying figures and descriptive matter in which there is illustrated and described a preferred embodiment of the invention.

BRIEF DESCRIPTION OF THE DRAWINGS

FIG. 1 is a view illustrating how the actuator of this present invention may be installed in the aircraft control system.

FIG. 2 is a mechanical schematic of the combination series and trim actuator of the invention.

FIG. 3 is a combined electrical/mechanical functional block diagram of the apparatus illustrated in FIG. 2.

DESCRIPTION OF THE PREFERRED EMBODIMENT

For a more complete appreciation of the invention, attention is invited to the following description of an illustrative embodiment of the invention particularly useful in helicopters but also useful in conventional aircraft. Referring first to FIG. 1, a typical installation of the combination series and trim actuator 10 in the aircraft control rigging is schematically illustrated. The actuator 10 includes an input shaft 12 and an output shaft 14 coupled together as hereinafter described. The actuator housing is installed in the aircraft's surface control system such that the input shaft 12 is coupled by any appropriate mechanical interface or linkages 11 directly to the pilot's control stick 16 and the output shaft 14 is coupled through similar conventional linkages 11' to the control surface member 18. The actuator housing 10' is provided with a suitable mounting flange such that it may be bolted directly to the airframe structure in a manner similar to conventional parallel actuators.

Referring now to FIG. 2, the input and output shafts 12, 14 may be mechanically connected together through an engage clutch 20 and appropriate gearings 22 and 24. The engage clutch 20, shown functionally in the figure, is a double function clutch wherein the input 12 is directly connected to the output 14 in one mode of operation (automatic controls disengaged) and in the other mode (automatic controls engaged) in which the clutch disengages the input from the output, that is, disengages gearing 22 from gearing 24 and at the same time engages or couples appropriate servo means responsive to automatic controls to the output shaft 14, e.g., in a series actuator mode. Interconnecting the input shaft 12 to the output shaft 14 is a mechanical link means 26 having a free play coupling 28 schematically illustrated and a spring 30 interconnecting the end portion of the link 26. The mechanical link means 26 or sloppy link is discussed herein with respect to the operation of the series actuator and safety features of the instant invention including switch 29 (FIG. 3) as will be described. The input shaft 12 is also coupled to an artificial feel and manual trim means 32 through gear means 34. The artificial feel and manual trim means 32 includes a torsion spring 36 coupled at one end to the input shaft 12 through gear means 34 and at the other end to a magnetic brake assembly 38. The magnetic brake assembly 38 includes clutch engaging means 40, 42, as field coil 44 and a d.c. power supply (not shown) coupled thereto for enabling the clutch means 40, 42. A damper 46 is coupled to the torsion spring 36 through appropriate gearing 47 for smoothing purposes. The artificial feel and trim means 32 provides feel forces and trim functions as described hereinafter in the description of its operation.

The actuator 10 further includes servomotor means 50 responsive to the stability augmentation and automatic flight control system. In the embodiment of the invention, illustrated in FIG. 2, a dual motor and tachometer means 52 and 54 are shown coupled through a differential 56. Such a dual servo configuration is described in H. Miller U.S. Pat. No. 3,504,248 and copending application of M. DeWalt, Ser. No. 811,653, filed June 30, 1977, both assigned to the instant assignee. Although illustrated in a dual servo configuration, the apparatus 10 of this invention may employ only one motor and tachometer, such as motor/tachometer 52. The output of the motors 52, 54 is coupled through the differential 56 through a shaft 58 and appropriate gearing to one side of the engage clutch 20 for driving the output shaft 14. The apparatus of this invention also includes a stick or input position synchro coupled to the input shaft 14, one synchro 60 and 62 for each motor 52 and 54 control channel, and a position feedback synchro 64, 66 for each motor control channel coupled to the output of the servos.

Referring now to the functional block diagram of FIG. 3, wherein like reference characters refer to corresponding elements of FIG. 2 and wherein dashed lines indicate mechanical connection and solid lines indicate electrical connections. The mechanical input 12 is mechanically coupled through the engage clutch 20 to the output 14 in the disengage mode and to the mechanical link means or sloppy link 26 to the output 14 in the engage mode. A latching circuit 68 responsive to engage/disengage logic input from the automatic control system logic means (not shown) is connected to control the engage clutch 20 for appropriate engagement thereof in response to an engage/disengage logic signal and also in response to an authority limit signal 67 associated with switch means (not shown) responsive to the travel limits of sloppy link 26, 28. The mechanical input 12 is also mechanically coupled to the artificial feel spring 36 which in turn is responsive to the magnetic brake 38 and damper 46 of the trim means 32. In this diagram, the trim means 32 is adjustable by the pilot as depicted by an input 33 to the magnetic brake 38 and also automatically through the automatic control system as will be described below. The mechanical input 12 is also shown mechanically coupled to the input position synchro 60, only one being shown in this illustration corresponding to a single servomotor 52 for simplicity.

The flight control computer, not shown, which may provide stability augmentation system (SAS) signals or, in the alternative, automatic flight control system (AFCS) signals provides an electric input 70 to a servo amplifier 72 of the servo means 50. The SAS/AFCS input signal 70 is coupled to the servo amplifier 72 through a limiter 74 and a summing junction 76 with the polarity as shown. The servo amplifier 72 is coupled to the motor 52 which is mechanically coupled via the engage clutch 20 to the output 14. The motor 52 includes the servo position synchro 64 which couples the servomotor's output position to a summing junction 78. The other input to the summing junction 78 is coupled to the output of the input position synchro 60, wherein the synchro position signals are coupled to the summing junction 78 with the polarities as shown. The difference in the signals at junction 78 produces a position error signal 77 which is coupled to the summing junction 76 to provide position feedback to the servo amplifier 72. The motor 52 also includes tachometer 53 to provide a damping signal to the servo amplifier 72 through the summing junction 76.

It is noted in this figure that the input member position synchro 60 signal is coupled to the SAS/AFCS computer control system to provide a control stick signal for command augmentation purposes, for example. The position error signal 77 is coupled through a comparator 80 and a time delay 82 to the magnetic brake 38 to provide an automatic trim function as previously indicated and to be hereinafter described.

In operation, with the actuator 10 of this invention disengaged or not powered, that is, the automatic controls disengaged, the input 12 is directly connected to the output 14 through the engage clutch 20 providing, for example, a one-to-one input/output drive ratio for direct pilot control of the aircraft control member. Typically, mechanical limits are installed on the output shaft corresponding to the desired total control authority for the aircraft surfaces, and the artificial feel trim means 32 provides the conventional artificial force feel and trim functions.

In the engaged or powered mode, for example, a SAS mode, the engage logic enables the latching circuit 68 providing clutch 20 excitation and "engaging" the actuator 10 of this invention, i.e., disengaging or disconnecting the direct mechanical input to output connection. It is noted, that in this engage mode, the input 12 is mechanically coupled only through the link means 26 to the output 14. The link means 26 is spring centered and includes a preferably adjustable dead zone with the magnitude limits adjustable to the desired series actuator authority. Limit switches 29 (FIG. 3) installed on link means 26 activate the limit switch logic 67 and latching circuit 68 when the authority limit has been reached. The spring gradients of the coupling link means 26 and the feel spring 36 are adjusted so that the output 14 can move through the link 26 by the motor 52 without moving the input 12, as long as the magnetic brake 38 is engaged. In the absense of SAS commands, the input position synchro 60 signal and the output position synchro 64 signal are summed in junction 78 providing an error signal to the servo amplifier 72 which drives the motor 52 such that the input and output position remain synchronized. If the power output capabilities of the motor are sufficient, a force boost function may be provided by the servo 50.

SAS command signals 70 are applied through limiter 74 to the servo means 50, through servo amplifier 72, which drives the motor 52 and surface 18. The limiter 74 prevents the servo output from reaching the limits set on the link means 26, such that the output moves without disturbing the input, that is, no feedback to the pilot control stick 16. In this manner, the unit functions as series actuator providing SAS control without feedback to the pilot.

In the event of a failure, such that the output is driven beyond the limits set by the limiter 74, the switches 29 associated with link means 26 and the limit switch logic 67 disable the latching circuit 68 and thereby disengage or remove the excitation of the clutch 20. As the clutch is disengaged, the input 12 is mechanically reconnected to the output 14, and the motor 52 is disconnected from the control path.

In like manner, in the automatic flight control (AFCS) mode of operation, the actuator 10 is operated as described above for SAS. However, in this mode, the engage logic also enables the time delay switch 82. If the AFCS commands the servo to a position beyond the comparator 80 trip point (set for the desired onset of automatic trim), that is, the difference between the input synchro 60 signal and output synchro 64 signal, or error signal 77 is greater than the comparator 80 limit, the magnetic brake 38 is released after an appropriate time delay which may be on the order of several seconds. With the brake 38 released, the input 12 will be mechanically moved to align with the output 14, i.e., to the new trim position, due to the force exerted by the centering spring 30 of the link 26. The damper 46 prevents abrupt movement and provides a reaction load for the recentering function. After the activator is recentered, the magnetic brake is re-engaged, establishing the new stick trim position. Servo loop failures are detected as in the SAS mode of operation and automatic disengagement occurs as described hereinabove.

It is noted that the actuator 10 may include dual servo for fail operational applications wherein the dual motors are summed through a differential 56 to drive the output. In this application, position synchros, tachometers, and preferably the engage clutch windings are dualized and suitable brakes coupled with the servomotor outputs responsive to single channel failure are provided so that no single failure prevents operation of one system as taught in the referenced Miller patent.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A combined series and trim actuator for aircraft automatic stabilization systems comprising:
   a housing adapted to be secured directly to the aircraft airframe and including input and output shafts coupled in the control rigging between the pilot's control member and an aircraft control member,
   a first coupling means between said input shaft and said output shaft so constructed and arranged to permit resilient, limited relative motion therebetween,
   a second coupling means between said input shaft and said output shaft including clutch means so constructed and arranged that in a first state of said clutch means said input and output shafts are directly connected and in a second clutch means state, said input and output shafts are disconnected,
   servomotor means having its output connected to drive said output shaft through said second coupling means in said second clutch means state, and
   electric signal means repsonsive to the difference in position between said input shaft and said output shaft for controlling said servomotor whereby to position said output shaft in accordance with the position of said input shaft within the authority of said first coupling means.

2. The actuator as set forth in claim 1 further including
   resilient feel means connected with said input shaft for providing artificial surface effect feel to the pilot for movements of said pilot's control member from an established trim position, and
   trim means coupled with said feel means for varying the trim position of said feel means.

3. The actuator as set forth in claim 2 wherein said trim means includes an electromagnetic clutch means and further including
   electric signal responsive means for actuating said trim clutch means whereby to provide automatic trim of said artificial feel means.

4. The actuator as set forth in claim 3 wherein said electric signal responsive means includes
   signal level detector means and time delay means responsive thereto for actuating said trim means upon the signal from said electric signal means exceeds a predetermined value for a predetermined time period.

5. The actuator as set forth in claim 3 wherein said resilient artificial feel means includes
   a torsion spring coupled with said input shaft and said clutch means, and
   damper means coupled with said torsion spring means.

6. The actuator as set forth in claim 2 wherein said first coupling means comprises
   a resiliently centered sloppy link for determining said authority limit, said link including switch means actuated in accordance with said authority limit, and
   logic means responsive to actuation of said switch means for operating said second coupling means clutch means to its first state.

7. The actuator as set forth in claim 1 further including
   further electric signal means responsive to an automatic aircraft control system for further controlling said servomotor means.

8. The actuator as set forth in claim 7 wherein said further electric signal means is responsive to an automatic aircraft stability augmentation system.

9. The actuator as set forth in claim 7 wherein said further electric signal means is responsive to an automatic aircraft flight control system.

10. The actuator as set forth in claim 1 wherein said electric signal means comprises
    first signal generating means coupled with said input shaft for providing output signal in accordance with the position thereof, second signal generator means coupled with said output shaft for providing an output signal in accordance with the position of said output shaft, and servomotor amplifier means responsive to the difference between the outputs of said first and second signal generator means.

11. The actuator as set forth in claim 1 wherein said servomotor means comprises first and second servomotors and mechanical differential means having its inputs responsive to said first and second servomotors, and its output connected to drive said output shaft, and wherein said electric signal means comprises first and second signal generators coupled to said input shaft and first and second signal generators coupled to said output shaft for controlling said first and second servomotors respectively in accordance with the difference between the signals generated by its respective first and second signal generators.

12. The actuator as set forth in claim 1 wherein said servomotor means in response to said differential signal provides a force boost to the said output shaft.

* * * * *